United States Patent [19]

Hörner et al.

[11] Patent Number: 5,252,056
[45] Date of Patent: Oct. 12, 1993

[54] CONTACT LENS CASTING MOULD

[75] Inventors: Wilhelm Hörner, Sulzbach/M; Peter Höfer, Aschaffenburg; Peter Hagmann, Hösbach-Bahnhof, all of Fed. Rep. of Germany

[73] Assignee: Ciba-Geigy Corporation, Ardsley, N.Y.

[21] Appl. No.: 926,560

[22] Filed: Aug. 6, 1992

Related U.S. Application Data

[63] Continuation of Ser. No. 669,168, Mar. 14, 1991, abandoned.

[30] Foreign Application Priority Data

Mar. 16, 1990 [CH] Switzerland .................. 00873/90

[51] Int. Cl.⁵ .................... B29C 39/40; B29D 11/00
[52] U.S. Cl. ........................... 425/555; 249/121; 249/134; 264/2.2; 425/808
[58] Field of Search ............ 425/589, 595, 408, 412, 425/808, 403.1, 116, 555; 249/112, 121, 127, 134, 95, 163, 165, 167, 154, 82, 155; 264/2.2, 2.3, 328.7, 2.6, 2.7

[56] References Cited

U.S. PATENT DOCUMENTS

| | | | |
|---|---|---|---|
| 3,374,982 | 3/1968 | Sallade | 249/121 |
| 3,684,234 | 8/1972 | Clinebell | 249/121 |
| 3,971,841 | 7/1976 | Rubinstein | 425/808 |
| 4,121,896 | 10/1978 | Shepherd | 425/808 |
| 4,211,384 | 7/1980 | Bourset et al. | 425/808 |
| 4,247,492 | 1/1981 | Neefe | 425/808 |
| 4,495,117 | 1/1985 | Feures et al. | 425/808 |
| 4,698,089 | 10/1987 | Matsuzaka et al. | 425/808 |
| 4,815,690 | 3/1989 | Shepherd | 425/808 |
| 5,015,280 | 5/1991 | Kimoto et al. | 425/808 |
| 5,087,015 | 2/1992 | Coalley | 264/2.2 |

FOREIGN PATENT DOCUMENTS

| | | |
|---|---|---|
| 0383425 | 8/1990 | European Pat. Off. |
| 59438 | 1/1970 | Luxembourg |
| 87/04390 | 7/1987 | PCT Int'l Appl. |
| 2216065 | 10/1989 | United Kingdom |
| 2226977 | 7/1990 | United Kingdom |

*Primary Examiner*—Khanh P. Nguyen
*Attorney, Agent, or Firm*—Edward McC. Roberts; William G. Hervey

[57] ABSTRACT

A contact lens casting mould includes two casting mould halves. A concave shaping surface (11) is constructed on a female part (1) and a convex shaping surface (21) on a male part (2). When joined together, the two casting mould halves (1 and 2) adhere by frictional connection.

11 Claims, 2 Drawing Sheets

CONTACT LENS CASTING MOULD

This application is a continuation of application Ser. No. 07/669,168, filed Mar. 14, 1991, now abandoned.

BACKGROUND OF THE INVENTION

The invention relates to a contact lens casting mould comprising two casting mould halves, a female part having a concave shaping surface and a male part having a convex shaping surface, which, when joined together, define a closed volume the bounding surfaces of which are formed by the two shaping surfaces.

Contact lenses are made from a wide variety of transparent materials. In conformity with contact lens materials used up to now a distinction is made between so-called hard contact lenses, for example consisting of polymethylmethacrylate (PMMA), and soft swellable contact lenses, for example those containing poly-2-hydroxyethylmethacrylate (P-HEMA). More recently, so-called hard/flexible lenses have also been made. For these, materials having a high oxygen-permeability, such as, for example, fluorinated polymers, are preferably used. Hard/flexible contact lenses of that kind are usually referred to also as RGP contact lenses, RGP standing for Rigid-Gas-Permeable.

Up to now, hard contact lenses and RGP contact lenses have customarily been produced from moulded lens blanks by shaping processes involving removal of the material, such as turning on special lathes or by laser machining. In these processes, the geometries of the front and rear surfaces, for example spherical, elliptical, generally aspherical, single-curved or multi-curved, for monofocal, bifocal, multifocal or toroidal contact lenses of the desired focal power are produced. In the same shaping step, but often also thereafter, elements for stabilising the lens on the eye, such as a prism ballast, slab-off zones, etc., can also be provided. Thereafter, the surfaces and the edge region of the contact lenses have to be generally polished. Overall, the manufacture of hard/flexible contact lenses requires a large number of very high precision production stages and is very complicated and expensive.

One way of simplifying the manufacturing process is to use a one-surface casting mould method. In this method, the front or rear surface of the contact lens is produced by pouring a mixture of monomers into a casting mould having a defined shaping surface and subsequently polymerising. The second surface of the lens, which is still in the rough state, must again be shaped by removing material. The additional polishing steps and especially the machining of the edge also still need to be carried out. The many production stages increase the production costs enormously and, in addition, it is difficult to guarantee the reproducibility of the manufacturing process.

So-called soft contact lenses also were originally manufactured mainly by the described shaping process involving removal of the material or by the described one-surface casting mould method. Such soft contact lenses achieve their final shape and their high flexibility as a result of subsequent hydration, the lenses absorbing about 30%-80% and more water, depending on the lens material used. Over the course of time, these manufacturing processes for soft contact lenses have been modified, and attempts have been made to provide so-called one-step manufacturing processes in which the contact lenses and, especially, their front and rear surface geometries are produced in one casting step. The casting moulds used for this are usually in two parts and consist of a male part and a female part having appropriately formed shaping surfaces for the geometries of the front and rear surfaces of the contact lens. In the joined state, these shaping surfaces define a specific volume which is filled with a liquid monomer in order to make a contact lens.

A process of that kind is described, for example, in GB-A-2,216,065. In that process, contact lens preshapes are produced in special moulds. These contact lens pre-shapes ideally already have the desired geometries of the front and rear surfaces, but machining of the edge of the contact lens is carried out in a separate step. Both halves of the casting mould have stop elements which serve to determine the final position of the mould halves when they are joined together. These stop elements are constructed in such a manner that they are able to execute a kind of bending movement so as to permit a relative movement of the mould halves towards each other in order to compensate for shrinkage.

In order to ensure that the geometries of the shaping surfaces are transferred to the front and rear surfaces of the contact lens accurately and reproducibly, it must be ensured that the two joined mould halves do not come undone or move away from each other. In addition, a substantially constant closing force must be maintained in order that no undesirable and indefinable deformations of the casting mould halves occur. A certain pressure must also be exerted on the two mould halves to ensure that the two mould halves move towards each other in order to compensate for the polymerisation shrinkage of the contact lens. The joined casting mould halves are therefore gripped in clamps which press the halves together with a relatively precisely defined closing force. These clamps prove to be a disadvantage, however, during the polymerisation of the contact lens material. In many cases they prevent a locally uniform entry of the UV light or microwave radiation with which the polymerisation is effected.

WO 87/04390 attempts to counter that disadvantage by forming on one of the mould halves locating pins which slide into bores in the second mould half when the mould halves are joined together. The protruding locating pins are then compressed in the manner of rivets by heat-deforming. Apart from the fact that this method of fastening the two mould halves scarcely allows accurate control of the closing force, after polymerisation of the contact lens it is awkward to separate the two mould halves from each other.

Similar considerations apply to processes in which the two halves of the casting mould are welded to each other at their edges. In this case also, the welded points have to be broken open again in an awkward manner in order to remove the contact lenses from the mould.

The process described in LU-A-59,438 in connection with the manufacture of window frames and the like, in which the position of two mould halves is fixed by a locking groove, is unsuitable for the manufacture of contact lenses. The two mould halves are locked with regard to their position relative to each other inter alia by locking members and levers, with the result that any relative movement between the mould halves is no longer possible. This, however, also prevents compensation of the shrinkage during polymerisation of the contact lens. The contact lens would become detached from the shaping surfaces and would in all probability be unusable.

There is therefore the problem of providing a contact lens casting mould with which the disadvantages described above do not arise. In particular, the casting mould halves are to be capable of being joined together easily and reliably and separated from each other again with equal ease. When the casting mould halves are joined together, the applied closing force is to be maintained as well as possible. Furthermore, the pre-requisites for manufacturing also hard and hard/flexible contact lenses in a one-step manufacturing process are to be provided. In particular, it is to be possible to produce the front and rear surface geometries and the edge of the contact lens in the casting mould during the actual casting process, substantially without further finishing. The desired contact lens is to be in its final form as soon as it has been removed from the mould. In addition, the casting mould is to be inexpensive and simple to manufacture and is to provide a simple means of storing and transporting the contact lenses. Furthermore, the shaping surfaces of the casting mould halves are to be protected as far as possible from scratches and damage.

SUMMARY OF THE INVENTION

These problems are solved by constructing a contact lens casting mould comprising two casting mould halves, a female part having a concave shaping surface and a male part having a convex shaping surface, which, when joined together, define a closed volume the bounding surfaces of which are formed by the two shaping surfaces, wherein the two joined casting mould halves adhere to each other solely by frictional connection. The dependent patent claims relate to further especially advantageous constructions.

BRIEF DESCRIPTION OF THE DRAWINGS

The invention is described in detail below with reference to the drawings, some of which are schematic views and in which.

DESCRIPTION OF THE PREFERRED EMBODIMENTS

Figure 1:
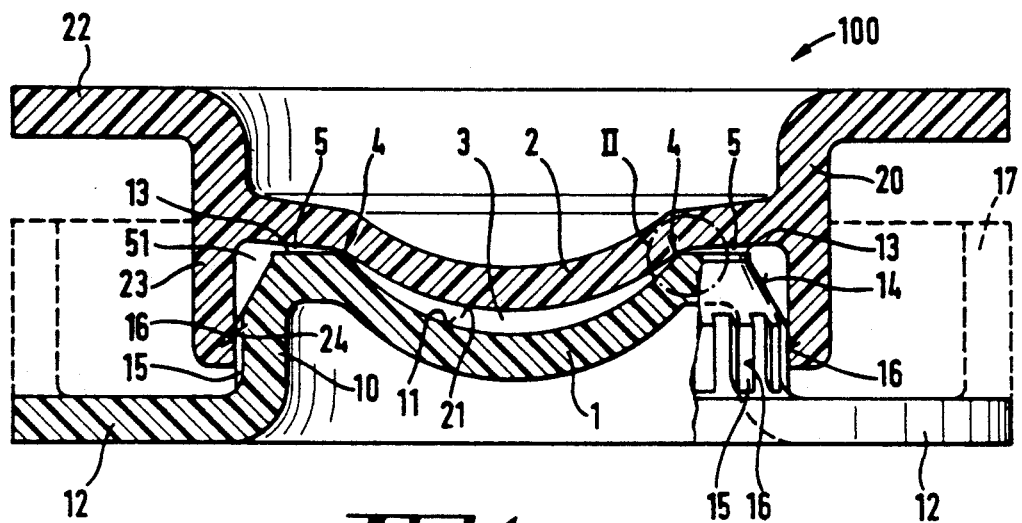
FIG. 1 shows a joined contact lens casting mould in cross-section.

A contact lens casting mould designated 100 overall comprises two casting mould halves, a female part 1 and a male part 2. The female part 1 has a substantially hat-like shape, with an approximately cylindrical body portion 10 having a top. The cylindrical body portion 10 has a flange-like projecting piece 12 which at the same time serves as a supporting surface for the female part. The outer surface of the top forms a concave shaping surface 11 which determines the geometry of the front surface of a contact lens to be manufactured.

Adjoining the concave shaping surface 11, the top of the cylindrical body portion 10 has an approximately horizontal shoulder 13. An outwardly and downwardly inclined face 14 forms the connection piece between the shoulder 13 and the vertical outer wall of the cylindrical body portion 10. Fixing elements 15, extending from the projecting piece 12 to about half the height of the body portion 10, are provided on the outer wall of the cylindrical body portion 10, which fixing elements are of rib-like construction in the embodiment shown. In particular, these rib-like fixing elements 15 extend to just below the inclined face. The rib-like fixing elements 15 are preferably arranged axially and symmetrically over the circumference of the outer wall of the cylindrical body portion.

Instead of rib-like fixing elements 15, fixing elements of a different construction could be provided, for example a single continuous cylindrical fixing element.

In addition, FIG. 1 indicates with broken lines a protective cylinder 17 which extends from the projecting piece 12 to above the level of the horizontal shoulder 13 which defines the concave shaping surface 11. Constructed in this manner, this continuous protective cylinder 17 protects the concave shaping surface 11 and, especially, the particularly sensitive transition region 4 between the concave shaping surface 11 and the shoulder 13 from any damage during storage and handling of the female part 1. The protective cylinder 17 may be constructed in the form of a continuous, or alternatively a discontinuous, cylinder. It may be arranged at the periphery of the projecting piece 12 or further inward in the radical direction.

The male part 2, that is to say the male casting mould half, has a hat-like shape with a convex shaping surface. This convex shaping surface 21 defines the geometry of the rear surface of the contact lens to be manufactured. The male part has a flange-like projecting piece 22. Extending from that flange-like projecting piece 22 is an approximately cylindrical hat portion 20, the top of which has the convex shaping surface 21 for the rear surface of the contact lens. A flange-like cylindrical extension 23 projects beyond the level of the summit of the convex shaping surface 21. The cylindrical extension 23 protects the convex shaping surface 21 from damage during storage and handling of the male part 2.

The cylindrical extension 23, in cooperation with the fixing elements 15, serves as a fastening for the two casting mould halves 1 and 2 when they are joined together. In particular, the internal diameter of the cylindrical extension 23 is so dimensioned that it can be slipped over the rib-like fixing elements 15 only by applying a certain closing force. The outer surfaces 16 of the rib-like fixing elements 15 and the inner surface 24 of the cylindrical extension 23, which then rest against each other, adhere by frictional connection and hold the two joined casting mould halves 1 and 2 in the correct position. In this manner, the closing force is retained after closing the casting mould halves, without additional closure devices, such as, for example, plates with integral closing springs or clamps, being necessary. This simplifies most decisively the handling of the casting moulds according to the invention after closure, for example the automated introduction of the casting moulds 100 into a polymerisation apparatus with X-ray, ultraviolet, infrared or microwave radiation. It is especially advantageous that the ultraviolet or microwave radiation is able to enter from both sides and unhindered by any external closure devices. In casting mould halves in which the female part 1 has a protective cylinder 17, the latter is preferably arranged at such a distance from the outer wall of the cylindrical body portion 10 that a narrow annular gap is left into which the cylindrical extension 23 of the male part 2 can be inserted and clamped. The frictional connection is then obtained not only at the outer surfaces of the fixing elements 15 and the inner surface of the cylindrical extension 23 which rest against each other but also at the outer surface of the cylindrical extension 23 and the inner surface of the protective cylinder 17 which rest against each other. At the same time, the protective cylinder 17 arranged in that manner is also able to serve as an automatic adjusting aid when the two casting mould halves 1 and 2 are being joined together.

Figure 2:
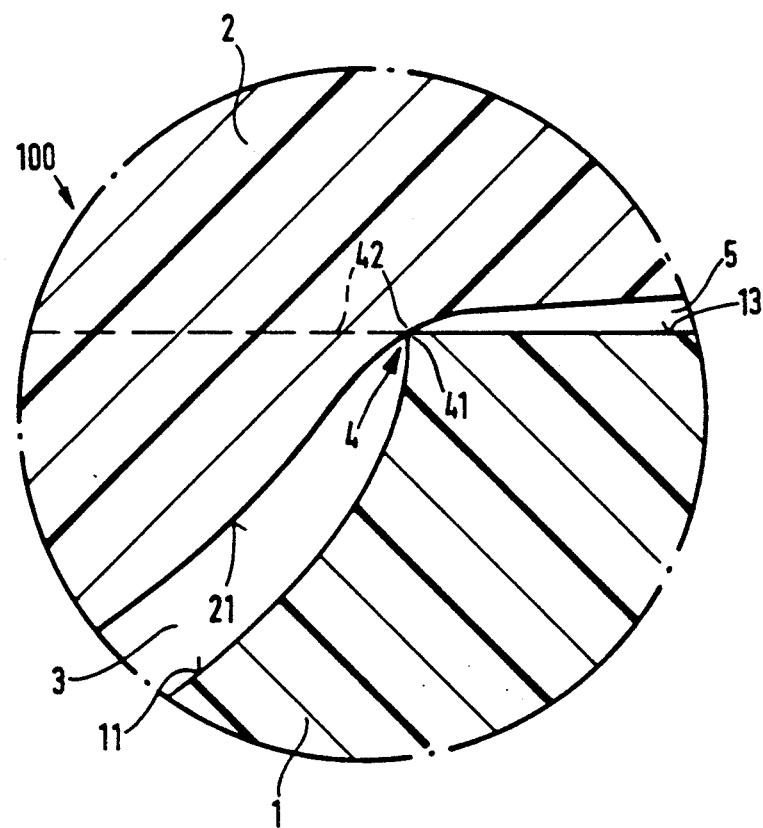
FIG. 2 shows the region of contact of the two casting mould halves on an enlarged scale and FIGS. 3 and 4 show embodiments of contact lens storage and transporting containers.

When joined together, the female part 1 and the male part 2 experience linear contact in the region of the transition 4 between the concave shaping surface 11 and the horizontal shoulder 13. FIG. 2 shows this portion of the two joined casting mould halves on an enlarged scale. The space 3 left between the two casting mould halves defines the shape of the contact lens to be manufactured. In the joined state, the edge 41 rests against the convex shaping surface of the male part 2 in the region 4. In particular, a linear support 42 is produced. The edge 41 may, as shown, be slightly rounded. Adjoining the linear support 42, a radially outwardly widening channel 5 is left between the two casting mould halves, which opens into an annular space 51 defined by the two casting mould halves 1 and 2. The volume of the annular space 51 is such that it is readily able to receive excess liquid monomer which is displaced when the two mould halves 1 and 2 are closed.

In order to manufacture a contact lens, a liquid monomer mixture is introduced into the female part 1. The male part is then placed on the female part. Excess monomer mixture displaced when the mould halves are placed together is able to flow away through the channel 5 into the annular space 51. The closing force with which the two mould halves 1 and 2 are pressed together manually or automatically is distributed between the frictional connection which alone causes the two mould halves to adhere to each other without additional, external closure means, and a surface pressing of the enclosed monomer. According to the applied closing force, the mould halves may furthermore undergo slight deformation in the region of the linear support 42. During the polymerisation process, which is preferably initiated by irradiation with ultraviolet or microwave radiation from both sides, the monomer volume 3 enclosed between the two casting mould halves undergoes a certain shrinkage, which may be up to 20%. As a result of this shrinkage in the volume of the contact lens material the counter-pressure exerted by the contact lens material on the two casting mould halves 1 and 2 as a consequence of the surface pressing is reduced. As a result, the bearing pressure in the region of the linear support 42 increases. This results in a greater deformation of the mould halves 1 and 2 in the region of the linear support 42. In this manner, the two shaping surfaces 11 and 21 move towards each other, without changing their geometries, just enough to compensate during polymerisation for the shrinkage in the volume of the contact lens material. This process is additionally assisted by interfacial forces between the contact lens material, the monomer and the shaping surfaces 11 and 21, which oppose detachment of the contact lens from the mould while it is being polymerised. The tensile forces thereby produced likewise increase the bearing pressure in the region of the linear support 42. By selecting a contact lens material that has an especially high affinity for the material of the casting mould when it is in the form of a monomer but not when it is in the form of a polymer; this assisting effect can be markedly increased still further. After the polymerisation, the two casting mould halves are separated again and the finished contact lens having perfect front and rear surfaces and, especially, a mostly perfect edge without so-called flash, can be removed. Owing to the special construction of the annular space 51, excess material that is still not completely polymerised is able to flow only towards the outside, and there is no danger that any material that is still liquid will run over the finished contact lens and render it useless when the casting mould is opened.

Figure 3:
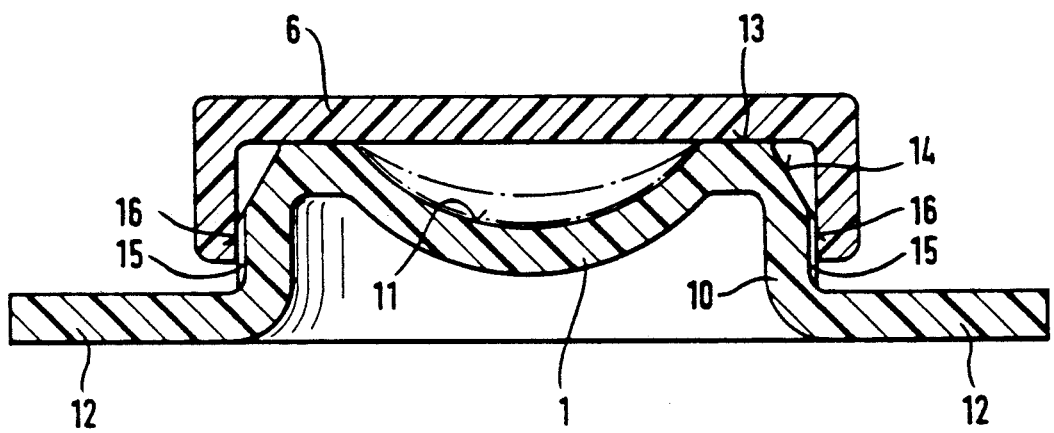
Figure 4:
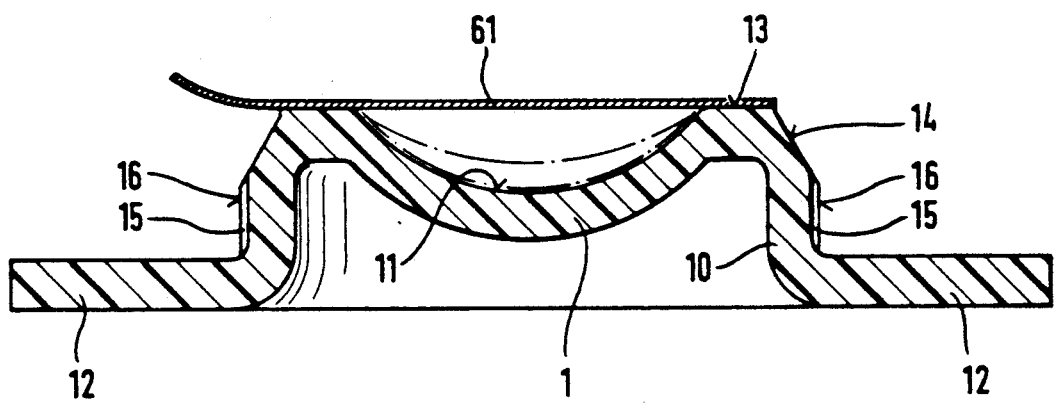

In a preferred variant, the female part can also be used as a hydration vessel and, especially, also directly as a storage and transport container for the manufactured contact lens. For this, it is sufficient to place some kind of sealing cap 6 over the female part 1, as shown in FIG. 3, the adhesion between the cap 6 and the female part 1 again being produced by the frictional connection between the inner surface of the cap and the rib-like closure elements 15. Preferably, the cap consists of polypropylene and is manufactured by injection-moulding. It would, of course, also be possible for a tear-off sealing foil 61 to be glued onto the horizontal surface piece 13 or applied thereto, for example, in a hot-seal process, as is illustrated in the embodiment shown in FIG. 4. The sealing foil is preferably a plastics-lined aluminium foil.

The two casting mould halves 1 and 2 are usually manufactured by the injection-moulding process. A thermoplastic material, preferably polypropylene, is used as the mould material. The thicknesses of the mould material are from 0.5 mm to 3 mm, preferably approximately 1.5 mm. In particular, in the forming of the casting moulds, care is taken that all the parts of the mould that are relevant to the manufacture of the contact lenses, for example those regions of the casting mould halves which have the shaping surfaces, are of approximately equal wall thickness. In particular, care is taken that no parts of the mould have too small a wall thickness. This ensures uniform filling of the moulds during injection-moulding and uniform cooling of the moulds, which satisfies the high requirements with regard to the dimensional accuracy of the moulds.

Manufacturing the casting mould halves by the injection-moulding process also allows shaping elements for dynamic stabilisation of the contact lens, such as, for example, prism ballast, slab-off zones etc., to be provided in the casting moulds.

The closure means, rib-like closure elements 15 and cylindrical extension 23, which automatically maintain the closing force can also be constructed to join the two casting mould halves 1 and 2 together in quite specific orientations. For example, one rib-like closure element could project further above the circumference and a groove could be provided at a corresponding location in the inner wall 24 of the cylindrical extension 23. This ensures that the two casting mould halves can be joined together only in a very specific orientation relative to each other, when the higher closure element coincides with the groove. Using casting mould halves modified in that manner, for example also toroidal lenses can be reliably manufactured. The construction of the flange-like projecting pieces 12 and 22 on the casting mould halves also offers a number of additional advantages. For example, the projecting pieces permit simple manipulation, they serve as a surface on which to stand the respective casting mould half, identification markings and sorting aids, for example a bar code, can be applied to them for easier identification, and, finally, adjusting markings can also be provided. In addition, the projecting pieces provide a protective function for the mould halves during storage and warehousing in automated production plants.

Overall, the construction according to the invention of the contact lens casting moulds permits simple manufacture of soft contact lenses and also, especially, of hard and hard/flexible contact lenses, with flawless front and rear surfaces and with a perfect edge. The casting moulds are simple and cheap to manufacture, easy to store and handle and, in addition, can even be used as storage and transport containers for finished contact lenses.

What is claimed is:

1. A contact lens casting mould comprising two casting mould halves, a first of said mould halves being a female part having a concave shaping surface and a second of said mould halves being a male part having a convex shaping surface, wherein said shaping surfaces delimit a closed volume having a concave-convex and generally rotation symmetrical shape when the female part and the male part are joined together, said female part having a cylindrical body portion surrounding the concave shaping surface, a vertical outer wall of said cylindrical body portion having fixing elements thereon, and said male part being provided with a cylindrical projecting extension surrounding and projecting beyond said convex shaping surface, and wherein said female part and said male part are joined together, said fixing elements and said cylindrical projecting extension adhere to each other soley by frictional contact for assuring a tight fit of said male and female parts wherein said fixing elements are of vertical ribs.

2. A contact lens casting mould according to claim 1, wherein, in the joined state, the two casting mould halves (1 and 2) are in contact with each other along a line (42).

3. A contact lens casting mould according to claim 1, wherein the female part (1) and the male part (2) each have a flange-like projecting piece (12, 22) at a side thereof opposite the shaping surfaces (11 and 21, respectively).

4. A contact lens casting mould according to claim 3, wherein a protective cylinder (17) extends from the flange-like projecting piece (12) of the female part (1) and beyond the concave shaping surface (11).

5. A contact lens casting mould according to claim 2, wherein, adjoining the line of contact (42) of the casting mould halves (1 and 2), at least one channel (5) is provided which opens into an annular space (51) defined by the two casting mould halves (1 and 2).

6. A contact lens casting mould according to claim 1, wherein the casting mould halves are comprised of a thermoplastic material.

7. A contact lens casting mould according to claim 1, wherein the casting mould halves (1 or 2) have a thickness in the region of the shaping surfaces (11 or 21) of from approximately 0.5 mm to approximately 3 mm.

8. A contact lens casting mould according to claim 1, and further comprising a sealing cap (6) which detachably adheres to the female part by frictional connection.

9. A contact lens casting mould according to claim 8, wherein the sealing cap (6) is comprised of polypropylene.

10. A contact lens casting mould according to claim 1, wherein the female part (1) is sealed with a detachable foil.

11. A contact lens casting mould according to claim 7, wherein the thickness of the casting mould halves (1 or 2) in the region of the shaping surfaces (11 or 21) is approximately 1.5 mm.

* * * * *